US008706656B1

(12) United States Patent
Lin et al.

(10) Patent No.: US 8,706,656 B1
(45) Date of Patent: Apr. 22, 2014

(54) MULTI-LABEL MODELING USING A PLURALITY OF CLASSIFIERS

(75) Inventors: Wei-Hao Lin, New York, NY (US); Travis H. K. Green, New York, NY (US); Robert Kaplow, New York, NY (US); Gang Fu, Kearny, NJ (US); Gideon S. Mann, New York, NY (US)

(73) Assignee: Google Inc., Mountain View, CA (US)

( * ) Notice: Subject to any disclaimer, the term of this patent is extended or adjusted under 35 U.S.C. 154(b) by 284 days.

(21) Appl. No.: 13/218,623

(22) Filed: Aug. 26, 2011

(51) Int. Cl.
*G06F 15/18* (2006.01)
*G06F 17/00* (2006.01)
*G06N 99/00* (2010.01)

(52) U.S. Cl.
CPC .................................. *G06N 99/005* (2013.01)
USPC .............................................. 706/12; 706/45

(58) Field of Classification Search
None
See application file for complete search history.

(56) References Cited

U.S. PATENT DOCUMENTS

| 7,349,919 | B2 | 3/2008 | Russell et al. | |
|---|---|---|---|---|
| 7,650,331 | B1 | 1/2010 | Dean et al. | |
| 2003/0212851 | A1 | 11/2003 | Drescher et al. | |
| 2005/0234753 | A1 | 10/2005 | Pinto et al. | |
| 2008/0154820 | A1* | 6/2008 | Kirshenbaum et al. | 706/20 |
| 2009/0106178 | A1 | 4/2009 | Chu | |

OTHER PUBLICATIONS

Chandra, Tushar, "Sibyl: a system for large scale machine learning" Keynote I PowerPoint presentation, Jul. 28, 2010, ladisworkshop.org [online]. [Retrieved on Jan. 25, 2011]. Retrieved from the Internet: <URL: http://ladisworkshop.org/sites/default/files/LADIS%202010%20actual.pdf>, 43 pages.
Duchi, John, et al., "Boosting with Structural Sparsity", 2009, cs.berkeley.edu [online]. [Retrieved on Jan. 25, 2011]. Retrieved from the Internet: <URL: http://www.cs.berkeley.edu/~jduchi/projects/DuchiSi09d.pdf>, 41 pages.
Duchi, John, et al., "Boosting with Structural Sparsity", Proceedings of the 26th International Conference on Machine Learning, Montreal, Canada, 2009, cs.berkeley.edu [online]. [Retrieved on Jan. 25, 2011]. Retrieved from the Internet: <URL: http://www.cs.berkeley.edu/~jduchi/projects/DuchiSi09a.pdf>, 8 pages.
R-Project web pages, 190 pages [online]. [Retrieved on May 18, 2010]. Retrieved from the Internet: <URL: http://www.r-project.org/>, 190 pages.
Uclassify web pages, [online] [Retrieved on May 18, 2010]. Retrieved from the Internet: <URL: http://www.uclassify.com/>, 16 pages.

(Continued)

*Primary Examiner* — Alan Chen
(74) *Attorney, Agent, or Firm* — Fish & Richardson P.C.

(57) ABSTRACT

Methods, systems, and apparatus, including computer programs encoded on computer storage media, for multi-label models. One of the methods includes receiving training records, each training record having an input, a first output, and a second output. The method includes generating a first classifier using as input one of the inputs and using as output a corresponding one of the first outputs. The method includes generating a second classifier using as input one of the inputs and using as output a corresponding one of the second outputs. The method includes inputting the inputs into the first classifier and generating first predictive outputs. The method includes inputting the inputs into the second classifier and generating second predictive outputs. The method also includes generating a third classifier using as input the first output and the second output and using as output the first output and the second output of the corresponding training record.

15 Claims, 9 Drawing Sheets

(56) References Cited

OTHER PUBLICATIONS

Zementis web pages [online]. [Retrieved on May 18, 2010]. Retrieved from the Internet: <URL: http://www.zementis.com/>, 34 pages.

PMML 4.0 General Structure of a PMML Document, [online] [Retrieved on May 1, 2011]. Retrieved from the Internet: <URL: dmg.org/v4-0-1/General Structure.html>, 9 pages.

Predictive Model Markup Language, [online] [Retrieved on May 1, 2011], Retrieved from the Internet: <URL:http://en.wikipedia.org/wiki/Predictive_Model_Markup_Language>, 7 pages.

Developer's Guide—Google Prediction, [online] [Retrieved on May 6, 2011], Retrieved from the Internet: ,URL: http:www.google.com/.../developer-guide.htm>, 7 pages.

Makhtar, Mokhairi, et al., "Predictive Model Representation and Comparison: Towards Data and Predictive Models Governance", Computational Intelligence (UKCI), 2010 UK Workshop: Sep. 8-10, 2010; 6 pages.

Netuitive Announces Amazon EC2 Integration for Hybrid Cloud Performance Management [online] [retrieved on Apr. 26, 2011], Retrieved from the Internet: <URL: marketwire.com/.../Netuitive-Announc...>, 2 pages.

Google Apps Script Overview [online] [retrieved on May 6, 2011], Retrieved from the Internet: <URL: code.google.com/.../guide.html>, 4 pages.

"Google Prediction API (Labs)", Google.com, [Retrieved on May 4, 2011]. Retrieved from the Internet: <URL: http://code.google.com/apis/predict/>, 1 page.

Creative Commons Attribution-Share Alike 3.0 Unported, Cross-validation (statistics)., May 28, 2011, retrieved from: http://en.wikipedia.org/w/index.php?title=Cross-validation_(statistics)&oldid=431307466; pp. 1-5.

Creative Commons Attribution-Share Alike 3.0 Unported, Winnow (algorithm)., May 29, 2011, retrieved from http://en.wikipedia.org/w/index.php?title=Winnow (algorithm)&oldid=431561845, 2 pages.

Bengio, Yoshua, Continuous Optimization of Hyper-Parameters, C.P. 6128, Succ. Centre-Ville, Montreal, Quebec, Canada, H3C 3J7, Sep. 29, 2000; Aug. 6, 2002, 7 pages.

Daelemans, Walter et al., Combined Optimization of Feature Selection and Algorithm Parameters in Machine Learning of Language, CNTS Language Technology Group, University of Antwerp, Universiteitsplein 1, B-2610 Antwerpen, Postdoctoral research of the Fund for Scientific Research, Flanders, Belgium, Nov. 24, 2003, 12 pages.

C.E. Rasmussen & C.K.I. Williams, Gaussian Processes for Machine Learning, Model Selection and Adaptation of Hyperparameters, Chapter 5, the MIT Press, 2006 Massachusetts Institute of Technology. [Retrieved from the Internet on Oct. 18, 2011]. Retrieved from the Internet: <URL: http://www.gaussianprocess.org/gpml/chapters/RW5.pdf, 24 pages.

Research on Prediction Technique of Network Situation Awareness, Wang, et al.; Cybernetics and Intelligent Systems, 2008 IEEE Conference on Digital Object Identifier: 10.1109/ICCIS.2008.4670783; pp. 570-574.

T. Dietterich, Ensemble Methods in Machine Learning:, J. Kittler and F. Foli (Eds.), MCS 2000, pp. 1-15.

Weiss, Integrating Real-Time Predictive Analytics into SAP Applications [online], Dec. 30, 2009 [retrieved on Sep. 29, 2011], Retrieved from the Internet: ,URL:http://www.sdn.sap.com/irj/scn/go/portal/prtroot/docs/library/uuid/a07faefd-61d7-2c10-bba6-89ac5ffc302c?QuickLink=index&overridelayout=true>, 1 page.

Hutter, et al., "Performance Prediction and Automated Tuning of Randomized and Parametric Algorithms,", Principles and Practice of Constraint Programing, Lecture Notes in Computer Science, 2006, 15 pages.

SAS Rapid Predictive Modeler, Overview, 2010, 4 pages.

Postema, et al., "A Decision Support Tool for Tuning Parameters in a Machine Learning Algorithm", Nanyang Techonological University, 1997, 9 pages.

"Active learning (machine learning)," Wikipedia, the free encyclopedia, [online] [retrieved on Sep. 8, 2011]. Retrieved from the Internet: http://en.wikipedia.org/wiki/Active learning (machine learning), 3 pages.

Giacinto et al., "An approach to the automatic design of multiple classifier systems," Pattern Recognition Letters 22 (2001) 25-33.

* cited by examiner

MULTI-LABEL MODELING USING A PLURALITY OF CLASSIFIERS

TECHNICAL FIELD

This specification relates to predictive model classifiers.

BACKGROUND

Predictive analytics generally refers to techniques for extracting information from data to build a model that can predict an output from a given input. Predicting an output can include predicting future trends or behavior patterns or performing sentiment analysis, to name a few examples. Various types of predictive models can be used to analyze data and generate predictive outputs. Typically, a predictive model is trained with training data that includes input data and output data that mirror the form of input data that will be entered into the predictive model and the desired predictive output, respectively.

SUMMARY

This document describes techniques for predictive model caching.

In general, one innovative aspect of the subject matter described in this specification can be embodied in methods that include the actions of receiving a plurality of training records, each training record including a training input and a first training output and a second training output. The methods include the actions of generating a first trained classifier using a first plurality of training records, each training record including as input one of the training inputs and including as output a corresponding one of the first training outputs, The methods include the actions of generating a second trained classifier using a second plurality of training records, each training record including as input one of the training inputs and including as output a corresponding one of the second training outputs. The methods include the actions of inputting the training inputs from the plurality of training records into the first trained classifier and generating a plurality of corresponding first predictive outputs. The methods include the actions of inputting the training inputs from the plurality of training records into the second trained classifier and generating a plurality of second predictive outputs. The methods also include the actions of generating a third trained classifier using a third plurality of training records, each training record including as input the first predictive output and the second predictive output that correspond to a particular training input of a particular training record and including as output the first training output and the second training output that correspond to the particular training input of the particular training record.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in generating the first predictive output may include generating a first score that is included in the first predictive output. The methods may also include the action of receiving a predictive request, the predictive request including a predictive input, generating a third predictive output comprising inputting the predictive input into the first trained classifier and generating a first intermediate output, inputting the predictive input into the second trained classifier and generating a second intermediate output, and inputting the first intermediate output and the second intermediate output together as input into the third trained classifier and generating the third predictive output. Inputting the first intermediate output and the second intermediate output may include generating an aggregate input comprising the first intermediate output and the second intermediate output. The methods may include the actions of determining that a first label and a second label applies to the predictive request based on the third predictive output wherein the first training outputs comprise the first label and the second training outputs comprise the second label. Generating the third trained classifier may include determining that a count of the first predictive outputs and the second predictive outputs exceeds a threshold.

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Classifiers are predictive models that are used to classify data. In general, a classifier determines a predictive output for a given input. For example, a classifier may determine whether an incoming e-mail is junk mail. In this example, the e-mail serves as the input and the predictive output is a "junk mail" label or a "not junk mail" label. Classifiers are limited in that they associate a single label with an input. A classifier may be able to determine that a set of data is indicative of a vanilla flavor, but cannot determine that the data is also indicative of a chocolate flavor. By training a series of predictive models, an interconnected network of classifiers can be developed to provide multiple predictive labels for a given input.

Figure 1:
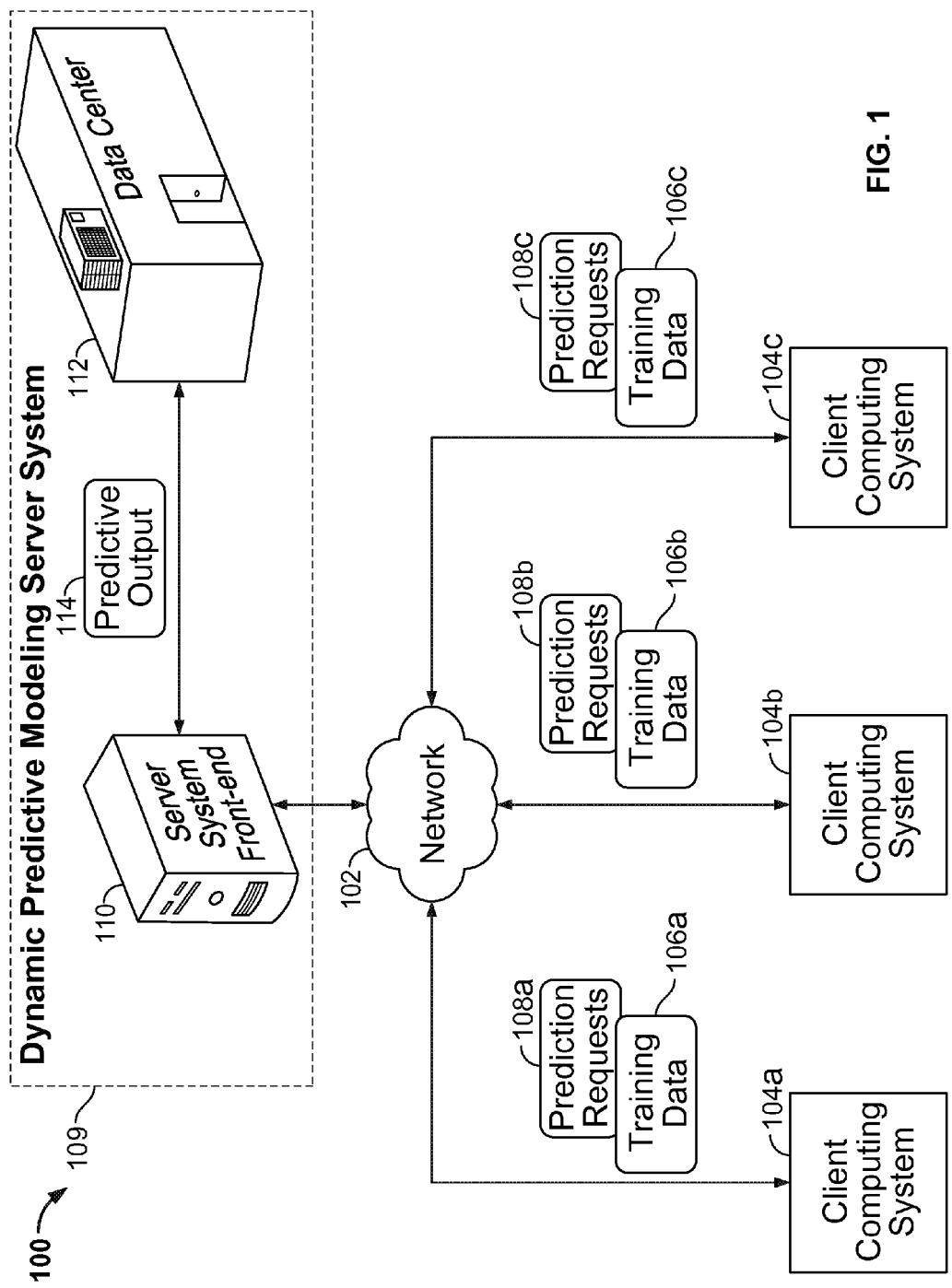
FIG. 1 is a schematic representation of an example system that provides a predictive analytic platform.

FIG. 1 is a schematic representation of a system that provides a predictive analytic platform. The system 100 includes multiple client computing systems 104a-c that can communicate with a predictive modeling server system 109. In the example shown, the client computing systems 104a-c can communicate with a server system front end 110 by way of a network 102. The network 102 can include one or more local area networks (LANs), a wide area network (WAN), such as the Internet, a wireless network, such as a cellular network, or a combination of all of the above. The server system front end 110 can be in communication with, or included within, one or more data centers, represented by the data center 112. A data center 112 generally is a large numbers of computers, housed in one or more buildings that are typically capable of managing large volumes of data.

A client entity—an individual or a group of people or a company, for example—may desire a trained predictive model that can receive input data from a client computing system 104a belonging to or under the control of the client entity and generate a predictive output. To train a particular predictive model can require a significant volume of training data, for example, one or more gigabytes of data. The client computing system 104a may be unable to efficiently manage such a large volume of data. Further, selecting and tuning an effective predictive model from the variety of available types of models can require skill and expertise that an operator of the client computing system 104a may not possess.

The system 100 described here allows training data 106a to be uploaded from the client computing system 104a to the predictive modeling server system 109 over the network 102. The training data 106a can include initial training data, which may be a relatively large volume of training data the client entity has accumulated, for example, if the client entity is a first-time user of the system 100. The training data 106a can also include new training data that can be uploaded from the client computing system 104a as additional training data becomes available. The client computing system 104a may upload new training data whenever the new training data becomes available on an ad hoc basis, periodically in batches, in a batch once a certain volume has accumulated, or otherwise.

The server system front end 110 can receive, store and manage large volumes of data using the data center 112. One or more computers in the data center 112 can run software that uses the training data to estimate the effectiveness of multiple types of predictive models and make a selection of a trained predictive model to be used for data received from the particular client computing system 104a. The selected model can be trained and the trained model made available to users who have access to the predictive modeling server system 109 and, optionally, permission from the client entity that provided the training data for the model. Access and permission can be controlled using any conventional techniques for user authorization and authentication and for access control, if restricting access to the model is desired. The client computing system 104a can transmit prediction requests 108a over the network. The selected trained model executing in the data center 112 receives the prediction request, input data and request for a predictive output, and generates the predictive output 114. The predictive output 114 can be provided to the client computing system 104a, for example, over the network 102.

Advantageously, when handling large volumes of training data and/or input data, the processes can be scaled across multiple computers at the data center 112. The predictive modeling server system 109 can automatically provision and allocate the required resources, using one or more computers as required. An operator of the client computing system 104a is not required to have any special skill or knowledge about predictive models. The training and selection of a predictive model can occur "in the cloud", i.e., over the network 102, thereby lessening the burden on the client computing system's processor capabilities and data storage, and also reducing the required client-side human resources.

The term client computing system is used in this description to refer to one or more computers, which may be at one or more physical locations, that can access the predictive modeling server system. The data center 112 is capable of handling large volumes of data, e.g., on the scale of terabytes or larger, and as such can serve multiple client computing systems. For illustrative purposes, three client computing systems 104a-c are shown, however, scores of client computing systems can be served by such a predictive modeling server system 109.

Figure 2:
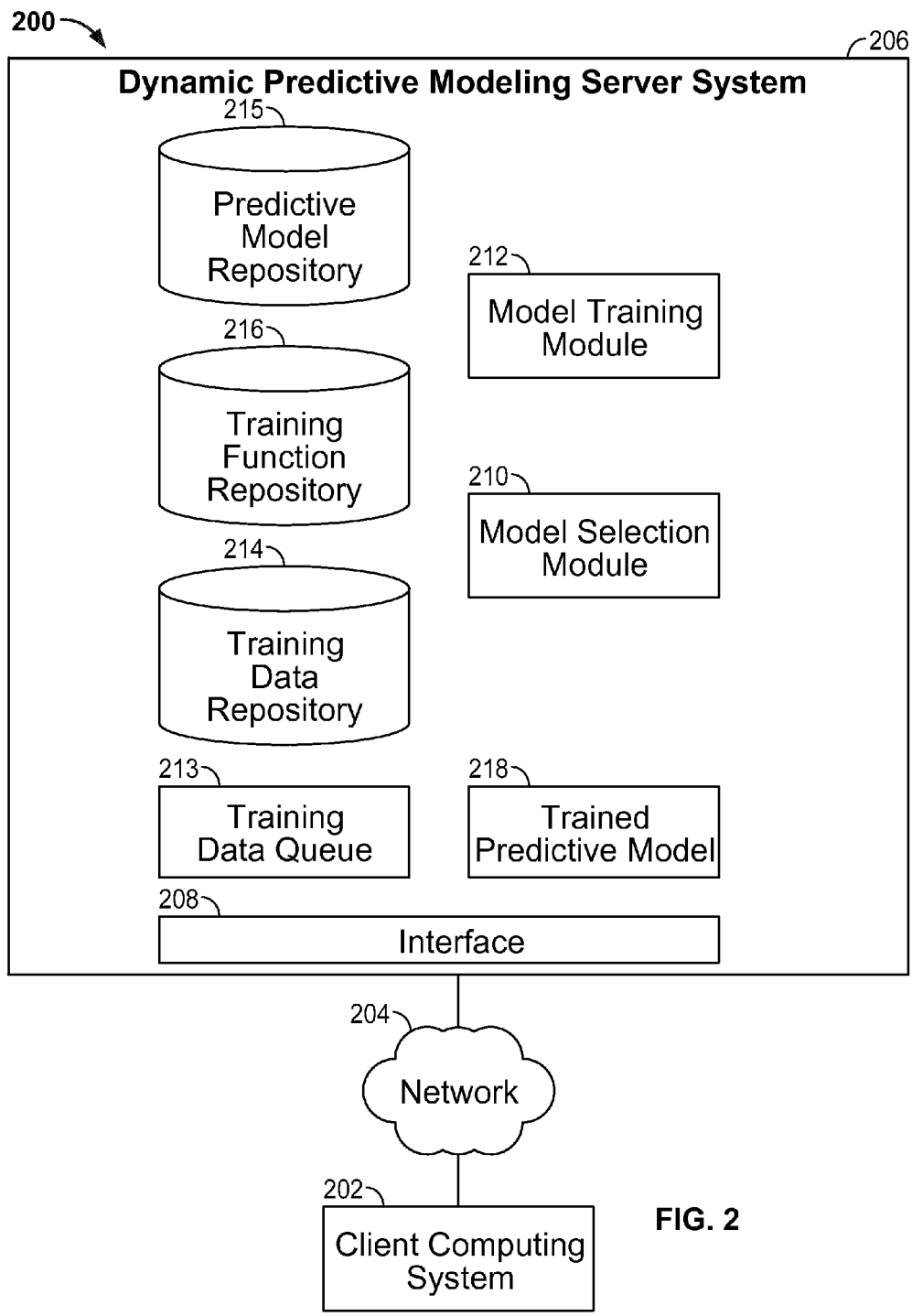
FIG. 2 is a schematic block diagram showing an example system for providing a dynamic predictive analytic platform over a network.

FIG. 2 is a schematic block diagram showing a system 200 for providing a dynamic predictive analytic platform over a network. For illustrative purposes, the system 200 is shown with one client computing system 202 communicating over a network 204 with a predictive modeling server system 206. However, it should be understood that the predictive modeling server system 206, which can be implemented using multiple computers that can be located in one or more physical locations, can serve multiple client computing systems. In the example shown, the predictive modeling server system includes an interface 208. In some implementations the interface 208 can be implemented as one or more modules adapted to interface with components included in the predictive modeling server system 206 and the network 204, for example, the training data queue 213, the training data repository 214, the model selection module 210 and/or the predictive model repository 218.

Figure 3:
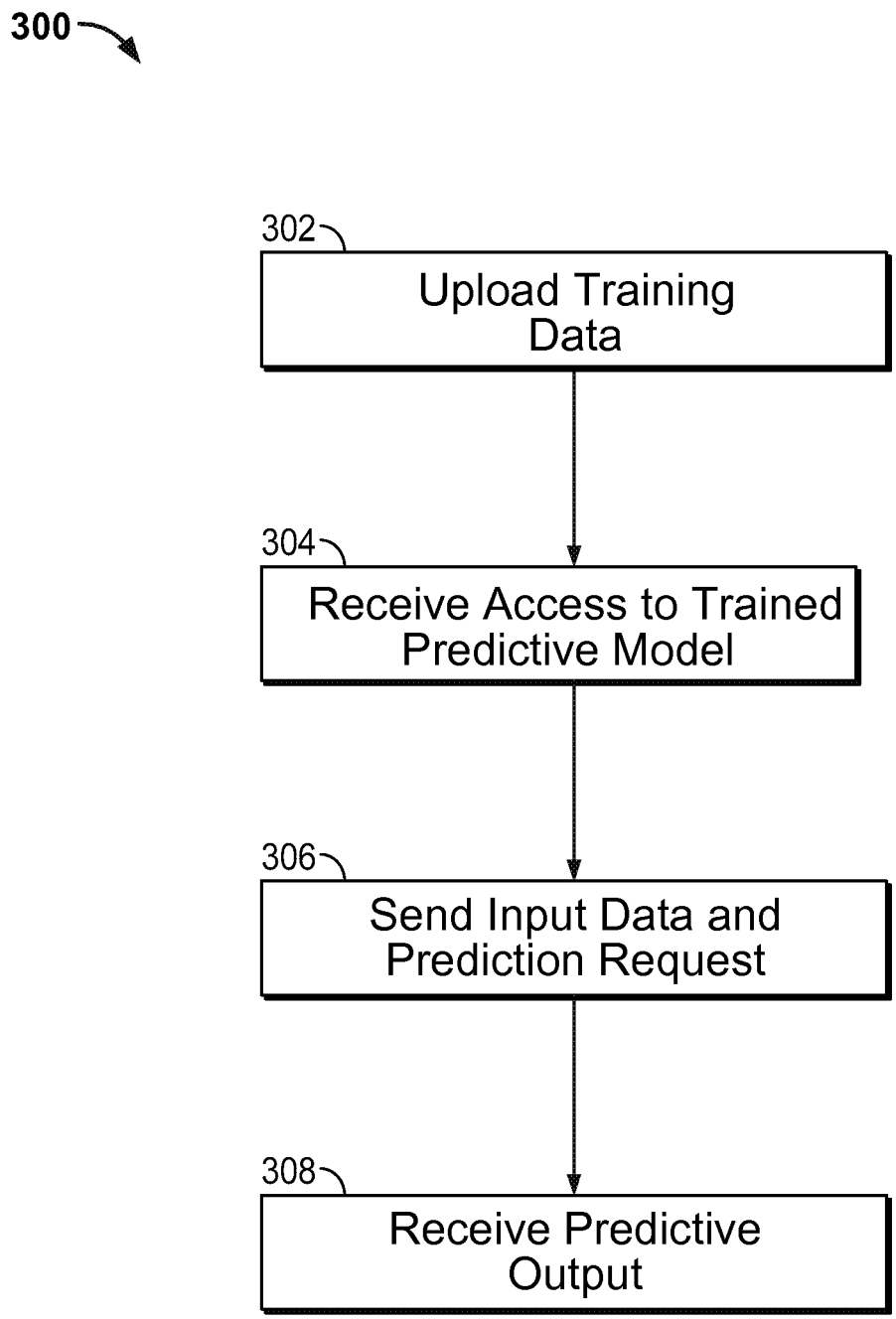
FIG. 3 is a flowchart showing an example process for using the predictive analytic platform from the perspective of the client computing system.

FIG. 3 is a flowchart showing an example process 300 for using the predictive analytic platform from the perspective of the client computing system 202. The process 300 can be carried out by the client computing system 202 when the corresponding client entity is uploading the initial training data to the system 206. The client computing system 202 uploads training data (i.e., the initial training data) to the predictive modeling server system 206 over the network 204 (Step 302). In some implementations, the initial training data is uploaded in bulk (e.g., a batch) by the client computing system 202. In other implementations, the initial training data is uploaded incrementally by the client computing system 202 until a threshold volume of data has been received that together forms the "initial training data". The size of the threshold volume can be set by the system 206, the client computing system 202 or otherwise determined. In response, the client computing system 202 receives access to a trained predictive model, for example, trained predictive model 218 (Step 304).

In the implementations shown, the trained predictive model 218 is not itself provided. The trained predictive model 218 resides and executes at a location remote from the client computing system 202. For example, referring back to FIG. 1, the trained predictive model 218 can reside and execute in the data center 112, thereby not using the resources of the client computing system 202. Once the client computing system 202 has access to the trained predictive model 218, the client computing system can send input data and a prediction request to the trained predictive model (Step 306). In response, the client computing system receives a predictive output generated by the trained predictive model from the input data (Step 308).

From the perspective of the client computing system 202, training and use of a predictive model is relatively simple. The training and selection of the predictive model, tuning of the hyper-parameters and features used by the model (to be described below) and execution of the trained predictive model to generate predictive outputs is all done remote from the client computing system 202 without expending client computing system resources. The amount of training data provided can be relatively large, e.g., gigabytes or more, which is often an unwieldy volume of data for a client entity.

Figure 4:
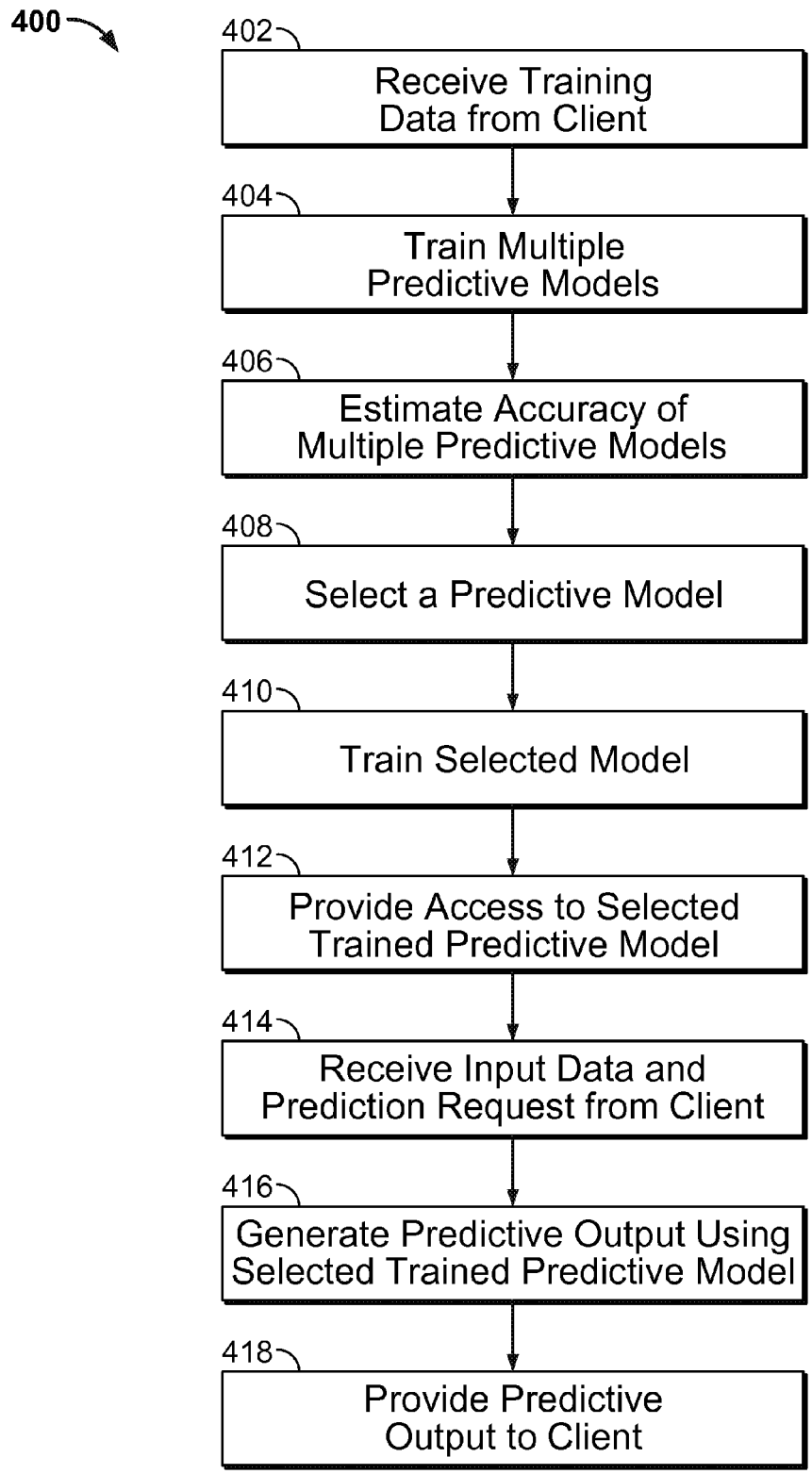
FIG. 4 is a flowchart showing an example process for serving a client computing system using the predictive analytic platform.

The predictive modeling server system 206 will now be described in more detail with reference to the flowchart shown in FIG. 4. FIG. 4 is a flowchart showing an example process 400 for serving a client computing system using the predictive analytic platform. The process 400 is carried out to provide access of a selected trained predictive model to the client computing system, which trained predictive model has been trained using initial training data.

Referring to FIG. 4, training data (i.e., initial training data) is received from the client computing system (Step 402). For example, the client computing system 202 can upload the training data to the predictive modeling server system 206 over the network 204 either incrementally or in bulk (i.e., as batch). As describe above, if the initial training data is uploaded incrementally, the training data can accumulate until a threshold volume is received before training of predictive models is initiated. The training data can be in any convenient form that is understood by the modeling server system 206 to define a set of records, where each record includes an input and a corresponding desired output. By way of example, the training data can be provided using a comma-separated value format, or a sparse vector format. In another example, the client computing system 202 can specify a protocol buffer definition and upload training data that complies with the specified definition.

The process 400 and system 200 can be used in various different applications. Some examples include (without limitation) making predictions relating to customer sentiment, transaction risk, species identification, message routing, diagnostics, churn prediction, legal docket classification, suspicious activity, work roster assignment, inappropriate content, product recommendation, political bias, uplift marketing, e-mail filtering and career counseling. For illustrative purposes, the process 400 and system 200 will be described using an example that is typical of how predictive analytics are often used. In this example, the client computing system 202 provides a web-based online shopping service. The training data includes multiple records, where each record provides the online shopping transaction history for a particular customer. The record for a customer includes the dates the customer made a purchase and identifies the item or items purchased on each date. The client computing system 202 is interested in predicting a next purchase of a customer based on the customer's online shopping transaction history.

Various techniques can be used to upload a training request and the training data from the client computing system 202 to the predictive modeling server system 206. In some implementations, the training data is uploaded using an HTTP web service. The client computing system 202 can access storage objects using a RESTful API to upload and to store their training data on the predictive modeling server system 206. In other implementations, the training data is uploaded using a hosted execution platform, e.g., AppEngine available from Google Inc. of Mountain View, Calif. The predictive modeling server system 206 can provide utility software that can be used by the client computing system 202 to upload the data. In some implementations, the predictive modeling server system 206 can be made accessible from many platforms, including platforms affiliated with the predictive modeling server system 206, e.g., for a system affiliated with Google, the platform could be a Google App Engine or Apps Script (e.g., from Google Spreadsheet), and platforms entirely independent of the predictive modeling server system 206, e.g., a desktop application. The training data can be large, e.g., many gigabytes. The predictive modeling server system 206 can include a data store, e.g., the training data repository 214, operable to store the received training data.

The predictive modeling server system 206 includes a repository of training functions for various predictive models, which in the example shown are included in the training function repository 216. At least some of the training functions included in the repository 216 can be used to train an "updateable" predictive model. An updateable predictive model refers to a trained predictive model that was trained using a first set of training data (e.g., initial training data) and that can be used together with a new set of training data and a training function to generate a "retrained" predictive model. The retrained predictive model is effectively the initial trained predictive model updated with the new training data. One or more of the training functions included in the repository 216 can be used to train "static" predictive models. A static predictive model refers to a predictive model that is trained with a batch of training data (e.g., initial training data) and is not updateable with incremental new training data. If new training data has become available, a new static predictive model can be trained using the batch of new training data, either alone or merged with an older set of training data (e.g., the initial training data) and an appropriate training function.

Some examples of training functions that can be used to train a static predictive model include (without limitation): regression (e.g., linear regression, logistic regression), classification and regression tree, multivariate adaptive regression spline and other machine learning training functions (e.g., Naïve Bayes, k-nearest neighbors, Support Vector Machines, Perceptron). Some examples of training functions that can be used to train an updateable predictive model include (without limitation) Online Bayes, Rewritten Winnow, Support Vector Machine (SVM) Analogue, Maximum Entropy (MaxEnt) Analogue, Gradient based (FOBOS) and AdaBoost with Mixed Norm Regularization. The training function repository 216 can include one or more of these example training functions.

Referring again to FIG. 4, multiple predictive models, which can be all or a subset of the available predictive models, are trained using some or all of the training data (Step 404). In the example predictive modeling server system 206, a model training module 212 is operable to train the multiple predictive models. The multiple predictive models include one or more updateable predictive models and can include one or more static predictive models.

The client computing system 202 can send a training request to the predictive modeling server system 206 to initiate the training of a model. For example, a GET or a POST request could be used to make a training request to a URL. A training function is applied to the training data to generate a set of parameters. These parameters form the trained predictive model. For example, to train (or estimate) a Naïve Bayes model, the method of maximum likelihood can be used. A given type of predictive model can have more than one training function. For example, if the type of predictive model is a linear regression model, more than one different training function for a linear regression model can be used with the same training data to generate more than one trained predictive model.

For a given training function, multiple different hyperparameter configurations can be applied to the training function, again generating multiple different trained predictive models. Therefore, in the present example, where the type of predictive model is a linear regression model, changes to an L1 penalty generate different sets of parameters. Additionally, a predictive model can be trained with different features, again generating different trained models. In some implementations, each feature may be assigned a different significance or weight. The selection of features, i.e., feature induction, can occur during multiple iterations of computing the training function over the training data. For example, feature conjunction can be estimated in a forward stepwise fashion in a parallel distributed way enabled by the computing capacity of the predictive modeling server system, i.e., the data center.

Considering the many different types of predictive models that are available, and then that each type of predictive model may have multiple training functions and that multiple hyperparameter configurations and selected features may be used for each of the multiple training functions, there are many different trained predictive models that can be generated. Depending on the nature of the input data to be used by the trained predictive model to predict an output, different trained predictive models perform differently. That is, some can be more effective than others.

The effectiveness of each of the trained predictive models is estimated (Step 406). For example, a model selection module 210 is operable to estimate the effectiveness of each trained predictive model. In some implementations, cross-validation is used to estimate the effectiveness of each trained predictive model. In a particular example, a 10-fold cross-validation technique is used. Cross-validation is a technique where the training data is partitioned into sub-samples. A number of the sub-samples are used to train an untrained predictive model, and a number of the sub-samples (usually one) is used to test the trained predictive model. Multiple rounds of cross-validation can be performed using different sub-samples for the training sample and for the test sample. K-fold cross-validation refers to portioning the training data into K sub-samples. One of the sub-samples is retained as the test sample, and the remaining K−1 sub-samples are used as the training sample. K rounds of cross-validation are performed, using a different one of the sub-samples as the test sample for each round. The results from the K rounds can then be averaged, or otherwise combined, to produce a cross-validation score. Ten-fold cross-validation is commonly used.

In some implementations, the effectiveness of each trained predictive model is estimated by performing cross-validation to generate a cross-validation score that is indicative of the accuracy of the trained predictive model, i.e., the number of exact matches of output data predicted by the trained model when compared to the output data included in the test sub-sample. In other implementations, one or more different metrics can be used to estimate the effectiveness of the trained model. For example, cross-validation results can be used to indicate whether the trained predictive model generated more false positive results than true positives and ignores any false negatives.

In other implementations, techniques other than, or in addition to, cross-validation can be used to estimate the effectiveness. In one example, the resource usage costs for using the trained model can be estimated and can be used as a factor to estimate the effectiveness of the trained model.

In some implementations, the predictive modeling server system 206 operates independently from the client computing system 202 and selects and provides the trained predictive model 218 as a specialized service. The expenditure of both computing resources and human resources and expertise to select the untrained predictive models to include in the training function repository 216, the training functions to use for the various types of available predictive models, the hyper-parameter configurations to apply to the training functions and the feature-inductors all occurs server-side. Once these selections have been completed, the training and model selection can occur in an automated fashion with little or no human intervention, unless changes to the server system 206 are desired. The client computing system 202 thereby benefits from access to a trained predictive model 218 that otherwise might not have been available to the client computing system 202, due to limitations on client-side resources.

Referring again to FIG. 4, each trained model is assigned a score that represents the effectiveness of the trained model. As discussed above, the criteria used to estimate effectiveness can vary. In the example implementation described, the criterion is the accuracy of the trained model and is estimated using a cross-validation score. Based on the scores, a trained predictive model is selected (Step 408). In some implementations, the trained models are ranked based on the value of their respective scores, and the top ranking trained model is chosen as the selected predictive model. Although the selected predictive model was trained during the evaluation stage described above, training at that stage may have involved only a sample of the training data, or not all of the training data at one time. For example, if k-fold cross-validation was used to estimate the effectiveness of the trained model, then the model was not trained with all of the training data at one time, but rather only K−1 partitions of the training data. Accordingly, if necessary, the selected predictive model is fully trained using the training data (e.g., all K partitions) (Step 410), for example, by the model training module 212. A trained model (i.e., "fully trained" model) is thereby generated for use in generating predictive output, e.g., trained predictive model 218. The trained predictive model 218 can be stored by the predictive modeling server system 206. That is, the trained predictive model 218 can reside and execute in a data center that is remote from the client computing system 202.

Of the multiple trained predictive models that were trained as described above, some or all of them can be stored in the predictive model repository 215. Each trained predictive model can be associated with its respective effectiveness score. One or more of the trained predictive models in the repository 215 can be updateable predictive models. In some implementations, the predictive models stored in the repository 215 are trained using the entire initial training data, i.e., all K partitions and not just K−1 partitions. In other implementations, the trained predictive models that were generated in the evaluation phase using K−1 partitions are stored in the repository 215, so as to avoid expending additional resources to recompute the trained predictive models using all K partitions.

Access to the trained predictive model is provided (Step 412) rather than the trained predictive model itself. In some implementations, providing access to the trained predictive model includes providing an address to the client computing system 202 or other user computing platform that can be used to access the trained model; for example, the address can be a URL (Universal Resource Locator). Access to the trained predictive model can be limited to authorized users. For example, a user may be required to enter a user name and password that has been associated with an authorized user before the user can access the trained predictive model from a computing system, including the client computing system 202. If the client computing system 202 desires to access the trained predictive model 218 to receive a predictive output, the client computing system 202 can transmit to the URL a request that includes the input data. The predictive modeling server system 206 receives the input data and prediction request from the client computing system 202 (Step 414). In response, the input data is input to the trained predictive model 218 and a predictive output generated by the trained model (Step 416). The predictive output is provided; it can be provided to the client computing system (Step 418).

In some implementations, where the client computing system is provided with a URL to access the trained predictive model, input data and a request to the URL can be embedded in an HTML document, e.g., a webpage. In one example, JavaScript can be used to include the request to the URL in the HTML document. Referring again to the illustrative example above, when a customer is browsing on the client computing system's web-based online shopping service, a call to the URL can be embedded in a webpage that is provided to the customer. The input data can be the particular customer's online shopping transaction history. Code included in the webpage can retrieve the input data for the customer, which input data can be packaged into a request that is sent in a request to the URL for a predictive output. In response to the request, the input data is input to the trained predictive model and a predictive output is generated. The predictive output is provided directly to the customer's computer or can be returned to the client computer system, which can then forward the output to the customer's computer. The client computing system 202 can use and/or present the predictive output result as desired by the client entity. In this particular example, the predictive output is a prediction of the type of product the customer is most likely to be interested in purchasing. If the predictive output is "blender", then, by way of example, an HTML document executing on the customer's computer may include code that in response to receiving the predictive output cause to display on the customer's computer one or more images and/or descriptions of blenders available for sale on the client computing system's online shopping service. This integration is simple for the client computing system, because the interaction with the predictive modeling server system can use a standard HTTP protocol, e.g. GET or POST can be used to make a request to a URL that returns a JSON (JavaScript Object Notation) encoded output. The input data also can be provided in JSON format.

The customer using the customer computer can be unaware of these operations, which occur in the background without necessarily requiring any interaction from the customer. Advantageously, the request to the trained predictive model can seamlessly be incorporated into the client computer system's web-based application, in this example an online shopping service. A predictive output can be generated for and received at the client computing system (which in this example includes the customer's computer), without expending client computing system resources to generate the output.

In other implementations, the client computing system can use code (provided by the client computing system or otherwise) that is configured to make a request to the predictive modeling server system 206 to generate a predictive output using the trained predictive model 218. By way of example, the code can be a command line program (e.g., using cURL) or a program written in a compiled language (e.g., C, C++, Java) or an interpreted language (e.g., Python). In some implementations, the trained model can be made accessible to the client computing system or other computer platforms by an API through a hosted development and execution platform, e.g., Google App Engine.

In the implementations described above, the trained predictive model 218 is hosted by the predictive modeling server system 206 and can reside and execute on a computer at a location remote from the client computing system 202. However, in some implementations, once a predictive model has been selected and trained, the client entity may desire to download the trained predictive model to the client computing system 202 or elsewhere. The client entity may wish to generate and deliver predictive outputs on the client's own computing system or elsewhere. Accordingly, in some implementations, the trained predictive model 218 is provided to a client computing system 202 or elsewhere, and can be used locally by the client entity.

Components of the client computing system 202 and/or the predictive modeling system 206, e.g., the model training module 212, model selection module 210 and trained predictive model 218, can be realized by instructions that upon execution cause one or more computers to carry out the operations described above. Such instructions can comprise, for example, interpreted instructions, such as script instructions, e.g., JavaScript or ECMAScript instructions, or executable code, or other instructions stored in a computer readable medium. The components of the client computing system 202 and/or the predictive modeling system 206 can be implemented in multiple computers distributed over a network, such as a server farm, in one or more locations, or can be implemented in a single computer device.

As discussed above, the predictive modeling server system 206 can be implemented "in the cloud". In some implementations, the predictive modeling server system 206 provides a web-based service. A web page at a URL provided by the predictive modeling server system 206 can be accessed by the client computing system 202. An operator of the client computing system 202 can follow instructions displayed on the web page to upload training data "to the cloud", i.e., to the predictive modeling server system 206. Once completed, the operator can enter an input to initiate the training and selecting operations to be performed "in the cloud", i.e., by the predictive modeling server system 206, or these operations can be automatically initiated in response to the training data having been uploaded.

The operator of the client computing system 202 can access the one or more trained models that are available to the client computing system 202 from the web page. For example, if more than one set of training data (e.g., relating to different types of input that correspond to different types of predictive output) had been uploaded by the client computing system 202, then more than one trained predictive model may be available to the particular client computing system. Representations of the available predictive models can be displayed, for example, by names listed in a drop down menu or by icons displayed on the web page, although other representations can be used. The operator can select one of the available predictive models, e.g., by clicking on the name or icon. In response, a second web page (e.g., a form) can be displayed that prompts the operator to upload input data that can be used by the selected trained model to provide predictive output data (in some implementations, the form can be part of the first web page described above). For example, an input field can be provided, and the operator can enter the input data into the field. The operator may also be able to select and upload a file (or files) from the client computing system 202 to the predictive modeling server system 206 using the form, where the file or files contain the input data. In response, the selected predicted model can generate predictive output based on the input data provided, and provide the predictive output to the client computing system 202 either on the same web page or a different web page. The predictive output can be provided by displaying the output, providing an output file or otherwise.

In some implementations, the client computing system 202 can grant permission to one or more other client computing systems to access one or more of the available trained predictive models of the client computing system. The web page used by the operator of the client computing system 202 to access the one or more available trained predictive models can be used (either directly or indirectly as a link to another web page) by the operator to enter information identifying the one or more other client computing systems being granted access and possibly specifying limits on their accessibility. Conversely, if the client computing system 202 has been granted access by a third party (i.e., an entity controlling a different client computing system) to access one or more of the third party's trained models, the operator of the client computing system 202 can access the third party's trained models using the web page in the same manner as accessing the client computing system's own trained models (e.g., by selecting from a drop down menu or clicking an icon).

A multi-label classifier system uses predictive models to associate multiple predictive outputs with a given predictive input. The dynamic predictive model server system 206, described above, can be used to implement a multi-label classifier system as described below. The techniques described above, with respect to FIG. 4, for training predictive models can be used to train the multi-label model system described below.

As discussed above, classifiers are a type of predictive model that determines the likelihood that a single predictive output applies to input data. For example, given a predictive request that describes flavor characteristics, a classifier may determine that the likelihood that the input data may generate a predictive output of "strawberry", or "chocolate", or "vanilla." However, classifiers do not determine that multiple labels apply as a group to the input data. For example, the labels "strawberry", "chocolate", and "vanilla" may all equally apply to Neapolitan ice cream.

The multi-label classifier system, described below, generates multiple predictive outputs associated with labels using a two stage process. In the first stage, trained individual classifiers generate output that identifies individual predictive labels that are applicable to the input. In the second stage, a trained multi-label classifier generates an output that identifies the applicability of a combination of one or more labels to the input based on the identified applicability of the outputs generated in the individual classifiers in the first stage. The multi-label classifiers in the second stage can be trained using the techniques discussed above (e.g., with respect to FIG. 4), as is further described below.

Figure 5A:
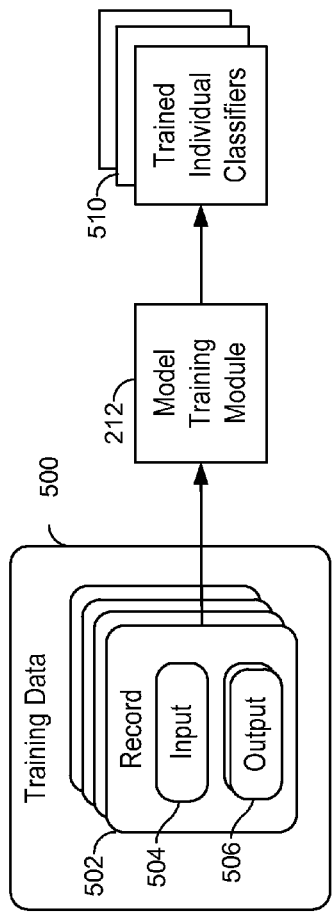
FIGS. 5A-C illustrate an example of training classifiers to associate a predictive input with multiple predictive outputs.
Figure 5B:
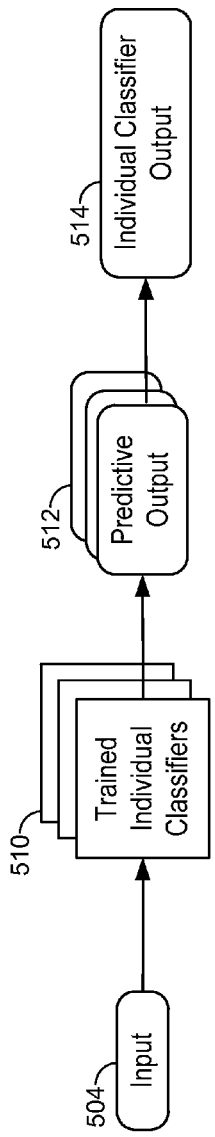
Figure 5C:
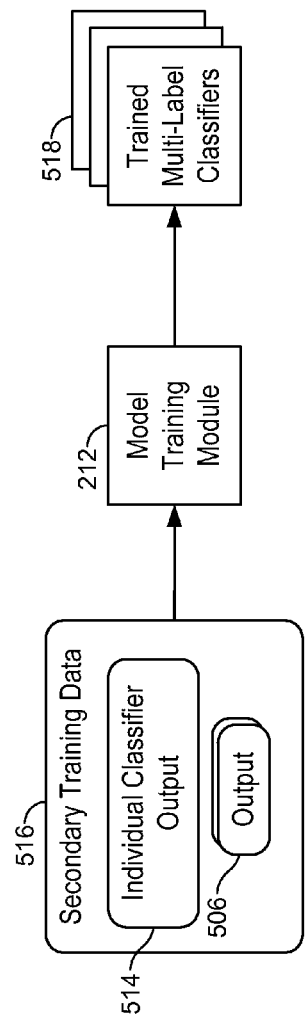

Systems and techniques are described to train multiple classifiers so as to provide multiple predictive outputs for a given single input. FIGS. 5A-C illustrate an example of training classifiers to associate a received input with multiple predictive outputs. Referring to FIG. 5A, training data 500 is supplied to the model training module 202. The training data 500 includes training records 502. Each training record 502 includes an input 504 and one or more corresponding outputs 506. For example, for a training record, the input may be some set of data (e.g., color is brown and white) and the outputs 506 may be "Chocolate" and "Vanilla".

Using techniques described above, the model training module 212 generates trained predictive models, referred to in this case as trained individual classifiers 510 since they are of the classifier type, using the training data. The model training module 212 may generate a trained predictive model using the techniques described above with respect to FIG. 4. For example, multiple training functions can be used to train multiple individual classifiers. The effectiveness of the multiple trained individual classifiers can be compared. The most effective trained individual classifier can be selected to be the predictive model. In some implementations, the model training module 212 trains a distinct trained individual classifier 510 for each distinct output 506 in the records 502 of training data 500. In other implementations, the model training module 212 only trains an individual classifier for an output if there are sufficient records associated with the output to train the classifier. The number of records required to train a classifier can vary depending on the complexity of the task. In some implementations, trained classifiers are only retained if the effectiveness of the trained classifiers exceeds a threshold.

Referring to FIG. 5B, for each of the training records 502, the input 504 is provided to the trained individual classifiers 510 as input with a predictive request, i.e., a request for a predictive output. In some implementations, the input 504 is provided to each of the trained individual classifiers 510.

Each of the trained individual classifiers 510 that is provided with the input 504 generates an intermediate predictive output 512. Each intermediate predictive output 512 includes a measure of the likelihood that a label associated with the trained individual classifier 510 is applicable to the input 504. For example, for the input described above, a trained individual classifier for "Vanilla" may produce a predictive output that the "Vanilla" label applies to the data with a measure of 0.35 and a trained individual classifier for "Chocolate" may produce a predictive output that the "Chocolate" label applies to the data with a measure of 0.45.

The intermediate predictive outputs 512 generated for an input 504 are combined to form an "individual classifier output" 514.

Referring to FIG. 5C, a secondary set of training data 516 is generated from the individual classifier output 514 and the outputs 506 included in the original training data 500. The model training module 212 generates trained multi-label classifiers 518 using the individual classifier output 514 as input and the outputs 506 as a predictive output. For example, the secondary training data may include the individual classifier output described above, ("Vanilla", 0.035; "Chocolate", 0.045), and the outputs "Vanilla", "Chocolate." In some implementations, the output is a set that includes each of the outputs (for example, ["Vanilla", "Chocolate"]). In general, the trained multi-label classifiers determine multi-label predictive outputs based on the connections between the labels.

In some implementations, the model training module 212 only generates a trained multi-label classifier for given outputs 506 if sufficient training data exists to train a classifier. In some implementations multi-label classifiers are only generated if multi-label examples are provided in the input data.

Figure 6:
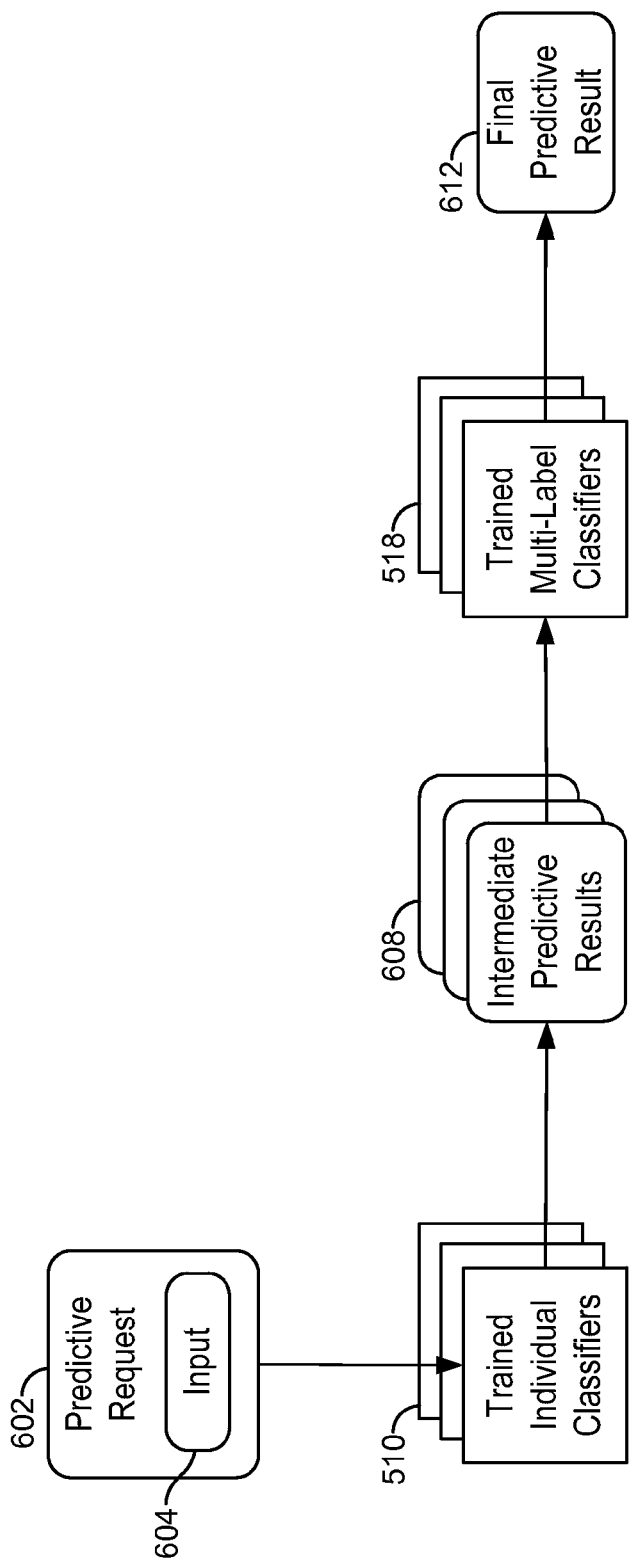
FIG. 6 illustrates an example of generating multi-label predictive outputs using trained classifiers.

FIG. 6 illustrates an example of generating multi-label predictive outputs using trained classifiers. The predictive request 602 includes an input 604. The input is provided to the trained individual classifiers 510, which were previously trained as described above.

As described above, identifying multiple labels associated with an input is a two stage process. In the first stage, the trained individual classifiers 510 generate intermediate predictive outputs 608. Each of the intermediate predictive outputs 608 include a label identified by the corresponding trained individual classifiers 510 and a confidence factor for each identified label.

In the second stage, the intermediate predictive outputs 608 are provided as input to each of the trained multi-label classifiers 618. The intermediate predictive outputs 608 are combined into a single input which is provided to each of the trained multi-label classifiers. In some implementations, all intermediate results are provided to each of the trained multi-label classifiers. In other implementations, only intermediate results with a score that exceeds a minimum threshold (for example, 0.1) are provided to the multi-label classifiers.

In some implementations, the intermediate predictive outputs 512 are only provided to each of a subset of the trained multi-label classifiers based on the labels and corresponding confidence measures of the intermediate predictive outputs. For example, if a trained multi-label classifier determines the applicability of the "Chocolate and Strawberry" label, and the intermediate predictive results do not include "Strawberry", or if the confidence measure associated with "Strawberry" is beneath a threshold (e.g. 0.10), then the intermediate predictive results may not be provided to that trained multi-label classifier.

Each of trained multi-label classifiers 518 determines predictive outputs. The predictive outputs are analyzed to determine a final predictive result 612 that includes one or more labels that apply to the input 604.

In some implementations, the final predictive result is the predictive output provided by the trained multi-label classifiers that has the highest confidence factor. In other implementations, all possible predictive results are provided with a distribution of scores. For example, the trained multi-label classifiers may process the intermediate predictive results and map the intermediate predictive results to new scores. For example, because labels A and B are usually seen together, and almost never with C, the trained multi-label classifiers may map these intermediate predictive results (e.g. 0.3, 0.3, 0.2) to a new set of final predictive results (e.g. 0.4, 0.4, 0.05). In some implementations, the final predictive results include labels that are chose based on co-occurrence frequency. The trained multi-label classifiers may require a minimum number of co-occurrences (for example, 10 co-occurrences). The final predictive results may be limited to a fixed number of final predictive results (for example, 10 sets of labels).

In some implementations, the final predictive results selected are filtered for distinctiveness. For example, only one set would be selected out of the sets of ["Vanilla", "Chocolate"], ["Vanilla", "Chocolate", and "Strawberry"], ["Vanilla", "Strawberry"] may be selected if the system determines that each of these sets are very similar. In the same example, a different set (e.g. ["Mint Chocolate Chip", "Mocha"]) may be select because it is different from the other sets, even if its confidence factor is not as high as some of the other similar sets.

In some implementations, the system may filter for categories that most frequently co-occur in the training set. The system may also track of specific training examples so that once a given set (e.g., ["Vanilla", "Chocolate", "Strawberry"]) is selected, all examples that are included other related sets (e.g. ["Vanilla" "Chocolate"], "Strawberry"], etc.) are removed. The system can use conventional clustering algorithms to identity frequent co-occurrence groups (such as K Means) based on the edit distance between the groups. For example If ["Vanilla", "Chocolate"] and ["Vanilla", "Strawberry"] are close, they will be grouped together while ["Vanilla", "Chocolate"] and ["Mint Chocolate Chip", "Mocha"] are very different and will be grouped separately.

Figure 7A:
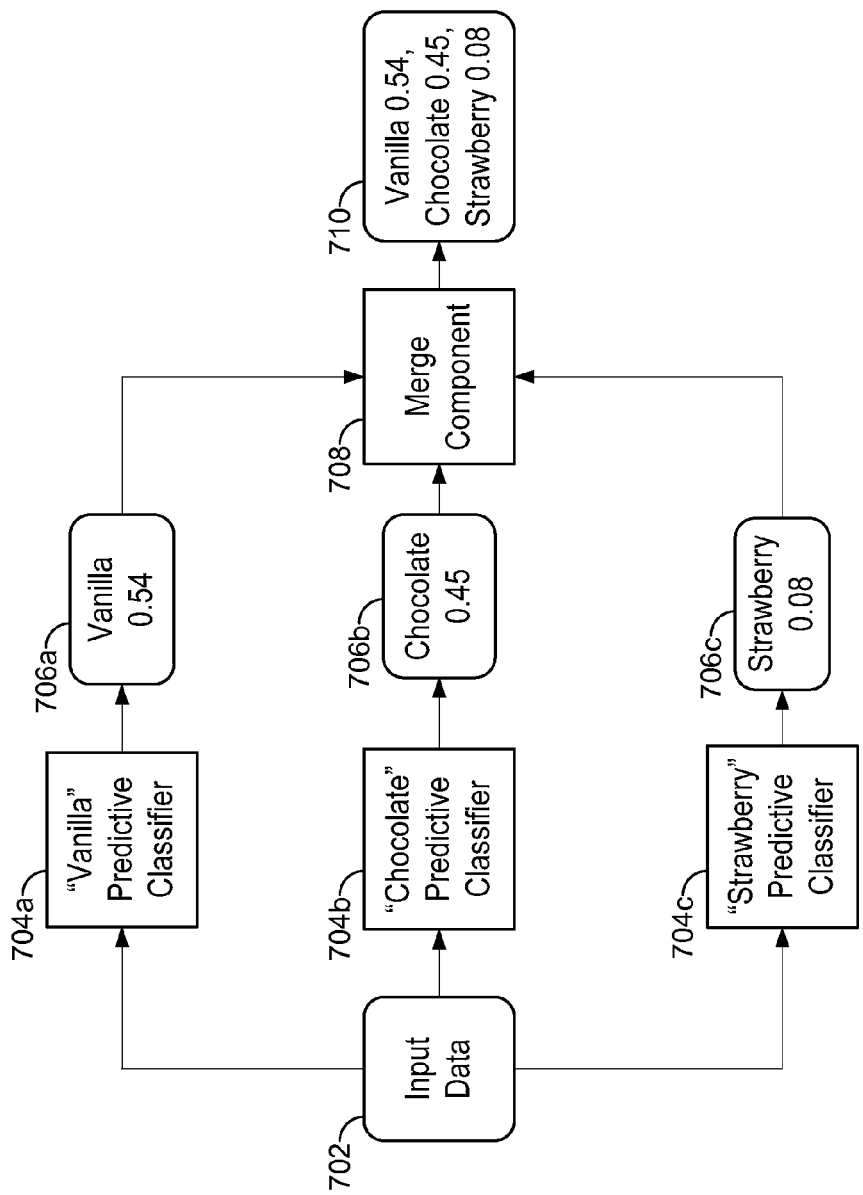
FIGS. 7A-7B illustrate an example of determining multiple labels for input data using classifiers.
Figure 7B:
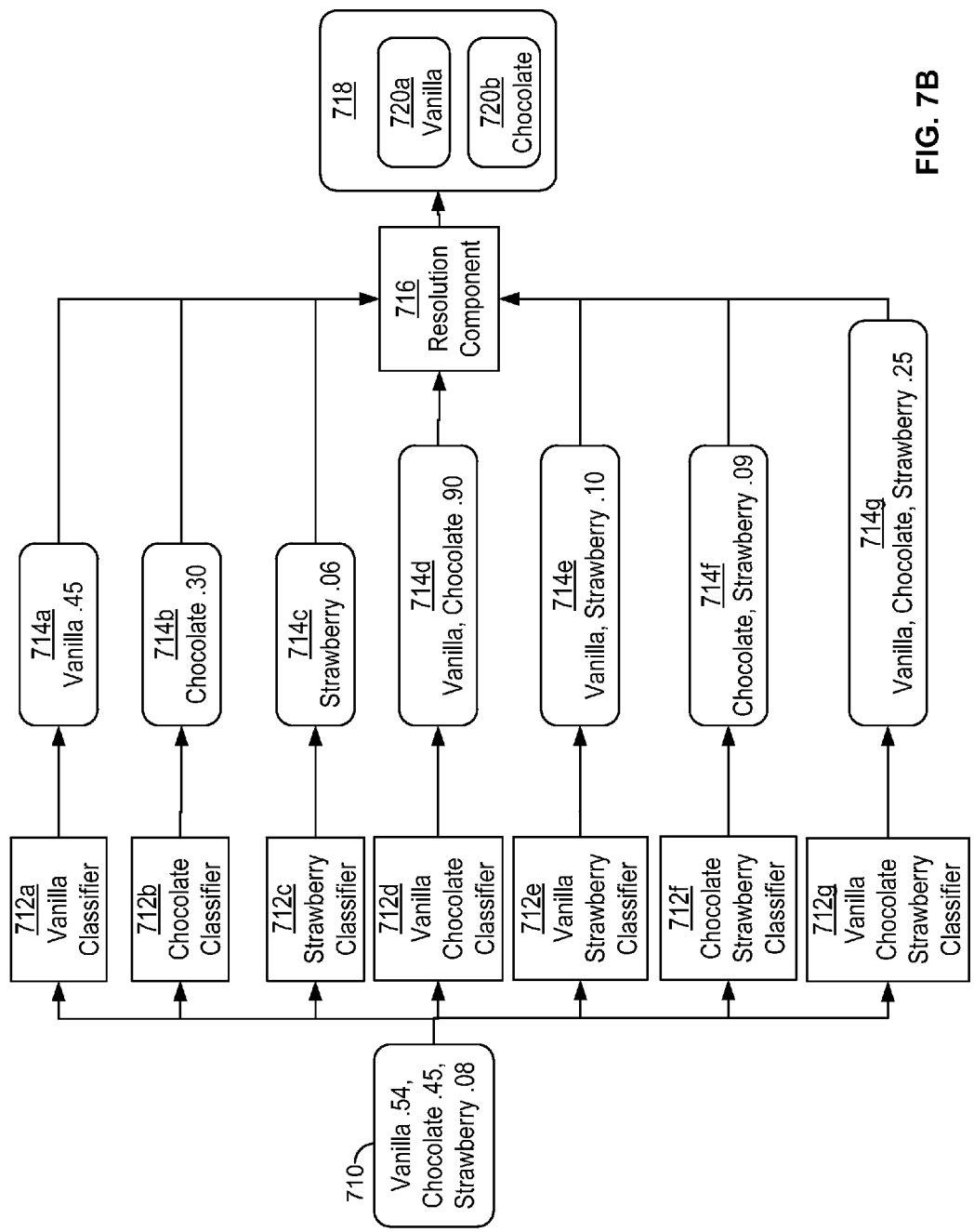

FIGS. 7A-7B illustrate an example of determining multiple labels for input data using classifiers Referring to FIG. 7A, a system includes a "Vanilla" Predictive Classifier 704a, a "Chocolate" Predictive Classifier 704b and a "Strawberry" Predictive Classifier 704c. Input data 702 is provided to each of the classifiers. The "Vanilla" Predictive Classifier 704a produces an intermediate predictive output 706a that indicates that the "Vanilla" label applies with a confidence factor of 0.54. The "Chocolate" Predictive Classifier 704b produces an intermediate predictive output 706b that indicates that the "Chocolate" label applies with a confidence factor of 0.45. The "Strawberry" Predictive Classifier 704c produces an intermediate predictive output 706c that indicates that the "Strawberry" label applies with a confidence factor of 0.08.

A merge component 708 combines the predictive outputs 706a-c into a single individual classifier output 710.

Referring to FIG. 7B, the system also includes multi-label classifiers. Multi-label classifiers identify one or more labels using the individual classifier output 710 as input. In this example, the multi-label classifiers include a "Vanilla" classifier" 712a, a "Chocolate" classifier 712b, a "Strawberry" classifier 712c, a "Vanilla, Chocolate" classifier 714d, a "Vanilla, Strawberry" 714e classifier, a "Chocolate, Strawberry" classifier 714f, and a "Vanilla, Chocolate, Strawberry" classifier 714g.

In some implementations, multi-label classifiers that correspond to a single label may be excluded from the multi-label classifiers (for example, the "Vanilla" classifier 714a, the "Chocolate" classifier 714b, and the "Strawberry" classifier 714c may not be trained)

In some implementations, not every possible combination of labels is represented by a multi-label classifier. Multi-label classifiers may only be present for combinations of labels for which sufficient training data exists to train the classifier. The multi-label classifiers determine a measure of the applicability of one or more labels to the individual classifier output 710.

In this example, the "Vanilla" classifier 712a generates a predictive output 714a that indicates that the "Vanilla" label applies with a confidence factor of 0.45. The "Chocolate" classifier 712b generates a predictive output 714b that indicates that the "Chocolate" label applies with a confidence factor of 0.30. The "Strawberry" classifier 712c generates a predictive output 714c that indicates that the "Strawberry" label applies with a confidence factor of 0.06. The "Vanilla, Chocolate" classifier 712d generates a predictive output 714d that indicates that the "Vanilla" and "Chocolate" labels apply with a confidence factor of 0.90. The "Vanilla, Strawberry" classifier 712e generates a predictive output 714e that indicates that the "Vanilla" and "Strawberry" labels apply with a confidence factor of 0.10. The "Chocolate, Strawberry" classifier 712f generates a predictive output 714f that indicates that the "Chocolate" and "Strawberry" labels apply with a confidence factor of 0.09. The "Vanilla, Chocolate, Strawberry" classifier 712g generates a predictive output 714g that indicates that the "Vanilla", "Chocolate", and "Strawberry" labels apply with a confidence factor of 0.25.

A resolution component 716 receives the predictive outputs 714a-g and determines the predictive output with the highest confidence factor to the individual classifier output 710. In this example, the resolution component proves the final predictive output 718 that includes the "Vanilla" label 720a and the "Chocolate" label 720b. In some implementations, each label may be associated with the confidence factor of the corresponding predictive output, for example the "Vanilla" label 720a and the "Chocolate" label 720b may each be associated with the confidence factor "0.90" of the "Vanilla, Chocolate" predictive output 714d.

In some implementations, the Resolution Component 716 selects the predictive output 714a-g that has the highest confidence factor and provides that predictive output as the final predictive output. For example, the resolution component 716 may provide the "Vanilla, Chocolate" predictive output 714d as the final predictive output.

In other implementations, the resolution component 716 produces a distribution of potential labels. For example, that "Vanilla" and "Chocolate" apply with a confidence factor of "0.90", that "Vanilla" alone applies with a confidence factor of 0.45, and that "Chocolate" alone applies with a confidence factor of "0.30".

Figure 8:
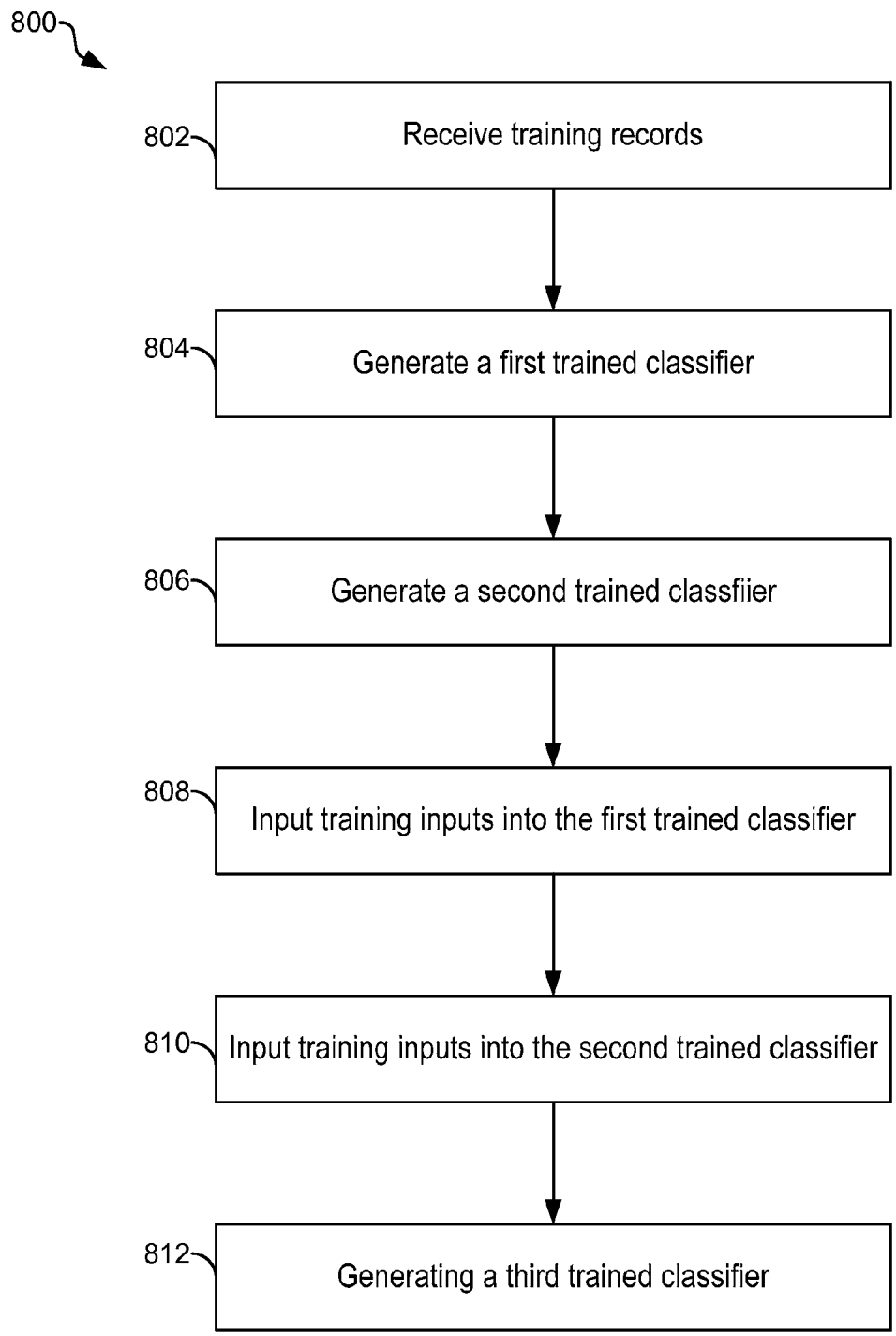
FIG. 8 is a flowchart of an example process for generating a multi-label classifier.

FIG. 8 is a flowchart of an example process 800 for generating a multi-label classifier. The process can be performed by the model training module 212 of FIG. 2. For convenience, the process 800 will be described in terms of a system performing the process.

The model training module 212 receives training records (Step 802). Individual training records in the plurality of training records include a training input and one or more training outputs. A plurality of the received training records includes a training input and first training output and a second training output. The training input can include a set of data. The training output can include labels that apply to the data. In some implementations, the process The model training module 212 generates a first trained classifier (Step 804). The model training module generates the first trained classifier as described above using as input the training input of the multiple training records and using as output the first training output of the multiple training records. An example of a first trained classifier is the "Vanilla" Predictive Classifier 704a of FIG. 7A.

The multiple training records are used as positive test cases, that is, the model training module 212 generates a first trained classifier such that the first training output applies to the training input.

Other records may also be used to generate the first trained classifier. Records that include the first trained output but do not include the second trained output can also be used as positive test cases. Records that do not include the first trained output may be used as negative test cases, that is, the records indicate that first trained output does not apply to the training input of those records.

The model training module 212 generates a second trained classifier (Step 806). The model training module generates the second trained classifier as described above using as input the training input of the multiple training records and using as output the second training output of the multiple training records. An example of a second trained classifier is the "Chocolate" Predictive Classifier 704b of FIG. 7A.

The training records are used as positive test cases, that is, the model training module 212 generates a second trained classifier such that the second training output applies to the training input. Other records may also be used to generate the second trained classifier. Records that include the second trained output but do not include the first trained output can also be used as positive test cases. Records that do not include the second trained output may be used as negative test cases, that is, the records indicate that second trained output does not apply to the training input of those records.

The model training module 212 inputs training inputs into the first trained classifier (Step 808). The first trained classifier generates multiple first predictive outputs. The first predictive outputs can include a measure of the applicability to the first training output to the training inputs, as determined by the first trained classifier. In some implementations, the first trained classifier generates a score for each of the first predictive outputs. The score can be a measure of the applicability of a predictive output to the corresponding training input. Referring to FIG. 7A, the input data 702 may be provided to the "Vanilla" Predictive Classifier 704a to generate a first predictive output, "0.54".

The model training module 212 inputs the training inputs into the second trained classifier (Step 810). The second trained classifier generates multiple second predictive outputs. The second predictive outputs can include a measure of the applicability to the second training output to the training inputs, as determined by the second trained classifier. In some implementations, the second trained classifier generates a score for each of the second predictive outputs. The score can be a measure of the applicability of a second predictive output to the corresponding training input. For example, referring to FIG. 7A, the input data 702 may be provided to the "Chocolate" Predictive Classifier 704b to generate a second predictive output, "0.45".

The model training module 212 generates a third trained classifier (Step 812). The model training module generates the third trained classifier as described. The model training module 212 uses as input the first predictive output and the second predictive output. The model training module 212 uses as output the first training output and the second training output. In some implementations, the model training module 212 also uses the scores generated by the first trained model and the second trained model as input. An example, of a third trained classifier is the "Vanilla, Chocolate" Classifier 714d of FIG. 7B.

Although the dynamic predictive modeling system described above in reference to FIGS. 1-4 can be used to implement the multi-label classifier system, for example, in a cloud, other systems can be used, including systems that are not cloud-based and/or are configured differently.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   receiving a plurality of training records, each training record including a training input and a first training output and a second training output;
   generating a first trained classifier using a first plurality of training records, each training record including as input one of the training inputs and including as output a corresponding one of the first training outputs;
   generating a second trained classifier using a second plurality of training records, each training record including as input one of the training inputs and including as output a corresponding one of the second training outputs;
   inputting the training inputs from the plurality of training records into the first trained classifier and generating a plurality of corresponding first predictive outputs;
   inputting the training inputs from the plurality of training records into the second trained classifier and generating a plurality of second predictive outputs;
   generating a third trained classifier using a third plurality of training records, each training record including as input the first predictive output and the second predictive output that correspond to a particular training input of a particular training record and including as output the first training output and the second training output that correspond to the particular training input of the particular training record;
   receiving a predictive request, the predictive request including a predictive input; and
   generating a third predictive output comprising:
      inputting the predictive input into the first trained classifier and generating a first intermediate output;
      inputting the predictive input into the second trained classifier and generating a second intermediate output; and
      inputting the first intermediate output and the second intermediate output together as input into the third trained classifier and generating the third predictive output.

2. The method of claim 1, wherein generating the first predictive output includes generating a first score that is included in the first predictive output.

3. The method of claim 1, wherein inputting the first intermediate output and the second intermediate output comprises:
   generating an aggregate input comprising the first intermediate output and the second intermediate output.

4. The method of claim 1, further comprising:
   determining that a first label and a second label applies to the predictive request based on the third predictive output wherein the first training outputs comprise the first label and the second training outputs comprise the second label.

5. The method of claim 1, wherein generating the third trained classifier includes determining that a count of the first predictive outputs and the second predictive outputs exceeds a threshold.

6. A non-transitory computer storage medium encoded with computer program instructions that when executed by one or more computers cause the one or more computers to perform operations comprising:
   receiving a plurality of training records, each training record including a training input and a first training output and a second training output;
   generating a first trained classifier using a first plurality of training records, each training record including as input one of the training inputs and including as output a corresponding one of the first training outputs;
generating a second trained classifier using a second plurality of training records, each training record including as input one of the training inputs and including as output a corresponding one of the second training outputs;
inputting the training inputs from the plurality of training records into the first trained classifier and generating a plurality of corresponding first predictive outputs;
inputting the training inputs from the plurality of training records into the second trained classifier and generating a plurality of second predictive outputs;
generating a third trained classifier using a third plurality of training records, each training record including as input the first predictive output and the second predictive output that correspond to a particular training input of a particular training record and including as output the first training output and the second training output that correspond to the particular training input of the particular training record;
receiving a predictive request, the predictive request including a predictive input; and
generating a third predictive output comprising:
inputting the predictive input into the first trained classifier and generating a first intermediate output;
inputting the predictive input into the second trained classifier and generating a second intermediate output; and
inputting the first intermediate output and the second intermediate output together as input into the third trained classifier and generating the third predictive output.

7. The medium of claim 6, wherein generating the first predictive output includes generating a first score that is included in the first predictive output.

8. The medium of claim 6, wherein inputting the first intermediate output and the second intermediate output comprises:
generating an aggregate input comprising the first intermediate output and the second intermediate output.

9. The medium of claim 6, further comprising:
determining that a first label and a second label applies to the predictive request based on the third predictive output wherein the first training outputs comprise the first label and the second training outputs comprise the second label.

10. The medium of claim 6, wherein generating the third trained classifier includes determining that a count of the first predictive outputs and the second predictive outputs exceeds a threshold.

11. A system comprising:
one or more computers and one or more storage devices storing instructions that are operable, when executed by the one or more computers, to cause the one or more computers to perform operations comprising:
receiving a plurality of training records, each training record including a training input and a first training output and a second training output;
generating a first trained classifier using a first plurality of training records, each training record including as input one of the training inputs and including as output a corresponding one of the first training outputs;
generating a second trained classifier using a second plurality of training records, each training record including as input one of the training inputs and including as output a corresponding one of the second training outputs;
inputting the training inputs from the plurality of training records into the first trained classifier and generating a plurality of corresponding first predictive outputs;
inputting the training inputs from the plurality of training records into the second trained classifier and generating a plurality of second predictive outputs;
generating a third trained classifier using a third plurality of training records, each training record including as input the first predictive output and the second predictive output that correspond to a particular training input of a particular training record and including as output the first training output and the second training output that correspond to the particular training input of the particular training record;
receiving a predictive request, the predictive request including a predictive input; and
generating a third predictive output comprising:
inputting the predictive input into the first trained classifier and generating a first intermediate output;
inputting the predictive input into the second trained classifier and generating a second intermediate output; and
inputting the first intermediate output and the second intermediate output together as input into the third trained classifier and generating the third predictive output.

12. The system of claim 9, wherein generating the first predictive output includes generating a first score that is included in the first predictive output.

13. The system of claim 11, wherein inputting the first intermediate output and the second intermediate output comprises:
generating an aggregate input comprising the first intermediate output and the second intermediate output.

14. The system of claim 11, further comprising:
determining that a first label and a second label applies to the predictive request based on the third predictive output wherein the first training outputs comprise the first label and the second training outputs comprise the second label.

15. The system of claim 11, wherein generating the third trained classifier includes determining that a count of the first predictive outputs and the second predictive outputs exceeds a threshold.

* * * * *